United States Patent [19]

Braun et al.

[11] Patent Number: 4,756,009

[45] Date of Patent: Jul. 5, 1988

[54] METHOD FOR TRANSMITTING DIGITAL DATA

[75] Inventors: Walter Braun, Wettingen; Dacfey Dzung, Nussbaumen; Walter Hagmann, Dättwil, all of Switzerland

[73] Assignee: BBC Brown, Boveri & Company, Limited, Baden, Switzerland

[21] Appl. No.: 881,235

[22] Filed: Jul. 2, 1986

[30] Foreign Application Priority Data

Jul. 15, 1985 [CH] Switzerland ............ 3068/85

[51] Int. Cl.⁴ ............... H04B 7/02; H04L 27/22
[52] U.S. Cl. ............................ 375/86; 375/40
[58] Field of Search ........... 342/16; 380/34; 371/37, 371/42, 69; 375/1, 40, 54, 111, 83, 85, 86; 455/63, 65

[56] References Cited

U.S. PATENT DOCUMENTS

| | | | |
|---|---|---|---|
| 3,310,741 | 3/1967 | Uitermark et al. | 375/40 |
| 3,736,507 | 5/1973 | Wolejsza et al. | 375/54 |
| 3,962,637 | 6/1976 | Motley et al. | 375/14 |
| 4,349,915 | 9/1982 | Costas | 375/40 |
| 4,583,231 | 4/1986 | Puckette | 375/1 |

FOREIGN PATENT DOCUMENTS 3230726 2/1984 Fed. Rep. of Germany .

OTHER PUBLICATIONS

IEEE Transactions on Communications, vol. COM-29, No. 11, Nov. 1981, pp. 1644, 1645, 1648, 1649, 1660-1663.

Archiv fur Elektronik und Ubertragungstechnik, Band 33, No. 7/8, Jul./Aug. 1979, Stuttgart, West Germany; J. Krebser.

IEEE, Transactions on Information Theory, Band IT-29, No. 4, Jul. 1983, New York; A. J. Viterbi et al.

Primary Examiner—Benedict V. Safourek
Attorney, Agent, or Firm—Oblon, Fisher, Spivak, McClelland & Maier

[57] ABSTRACT

A method for transmitting digital data wherein the data are transmitted in several transmission sections (I–IV) which in each case contain several symbols (1–6). In the transmitter, the phase of a carrier wave is modulated by n different phase angles and their frequency is suddenly changed at the beginning or at the end of each transmission section. So that the individual transmission sections (I–IV) can be synchronized in the receiver, at least one symbol from each transmission section is additionally transmitted by the transmitter in another transmission section as synchronization information. In the receiver, the phases of the carrier wave within the individual transmission sections, that is to say the block phases, are first determined independently of each other by means of an estimating method directly from sections of the carrier wave modulated with the respective data, apart from a phase uncertainty of n-times. The final block phases are finally obtained by evaluation of the synchronization information.

3 Claims, 4 Drawing Sheets

METHOD FOR TRANSMITTING DIGITAL DATA

BACKGROUND OF THE INVENTION

1. Field of the Invention

This invention relates to a method of transmitting digital data, such as is known from an article by Marvin K. Simon and Andreas Polydoros, entitled "Coherent Detection of Frequency-Hopped Quadrature Modulations in the Presence of Jamming-Part I: QPSK and QASK Modulations", published in IEEE Transactions on Communication, Vol. COM-29, No. 11, November 1981, Pages 1644 and following.

2. Discussion of Background

As a modulation process, the so-called "Phase Shift Keying" (abbreviated to PSK) is used in the article mentioned. This is a modulation process with very favorable power characteristics, for example in comparison with the so-called "Frequency Shift Keying" (abbreviated to FSK), but which, as a coherent process, requires in each case the accurate knowledge of the phase of the carrier wave during the detection of the transmitted data in the receiver. Owing to the continuous sudden change in frequency of the carrier wave, also called "Frequency Hopping" (abbreviated to FH) in communications engineering, in order to evade narrow-band interference sources in the transmission path, the phase coherence can be lost. For this reason, the phase of the carrier wave must, as a rule, be re-determined between two frequency jumps in each case in each transmission section. In the article mentioned, this phase determination is pointed out as a difficult problem. Fundamentally, this problem could be solved by transmitting special synchronization information, for example in a preamble, in addition to the data in each transmission section. But this solution is very elaborate and therefore not very practicable.

SUMMARY OF THE INVENTION

Accordingly, one object of this invention is to provide a novel method of the type initially mentioned, in which a simple determination, which, in particular, is favorable with respect to power and is nevertheless reliable, of the relative phase relationship between the various transmission sections is made possible.

The above objects and others are achieved according to the invention by providing a new and improved method for transmitting digital data in several transmission sections (I-IV) which in each case contains several symbols (1-6) and in which the phase of a carrier wave is modulated by phase angles from the set of phase angles $[0, 2\pi/n, \ldots, (n-1)2\pi/n]$ with n elements in the transmitter for forming the symbols (1-6) and the frequency of the elements is suddenly changed at the beginning or at the end of each transmission section (I-IV), wherein the transmitter additionally transmits at least one symbol from each transmission section in another transmission section as synchronization information for the receiver for synchronizing the transmission sections (I-IV). In the receiver, the phases of the carrier wave are determined within the individual transmission sections (I-IV), called block phases, initially up to a phase uncertainty of n-times, independently of each other by means of estimating directly from sections of the carrier waves which are modulated with the respective data and wherein the final block phases are obtained by evaluation of the synchronization information.

The advantages achieved by the invention can be essentially seen in the fact that "Frequency Hopping" can now be applied without difficulty in conjunction with "Phase Shift Keying". In particular, the unavoidable additional expenditure of energy, which is required for carrying out the method according to the invention, is so low that the power advantage gained by the "Phase Shift Keying" in comparison with other modulation processes such as the "Frequency Shift Keying" mentioned is largely retained. Another advantage of the method according to the invention is that the block phases are directly determined from the sections of the carrier waves which are modulated with the respective data. No synchronization information transmitted additionally to the data, for example in a preamble, is required.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
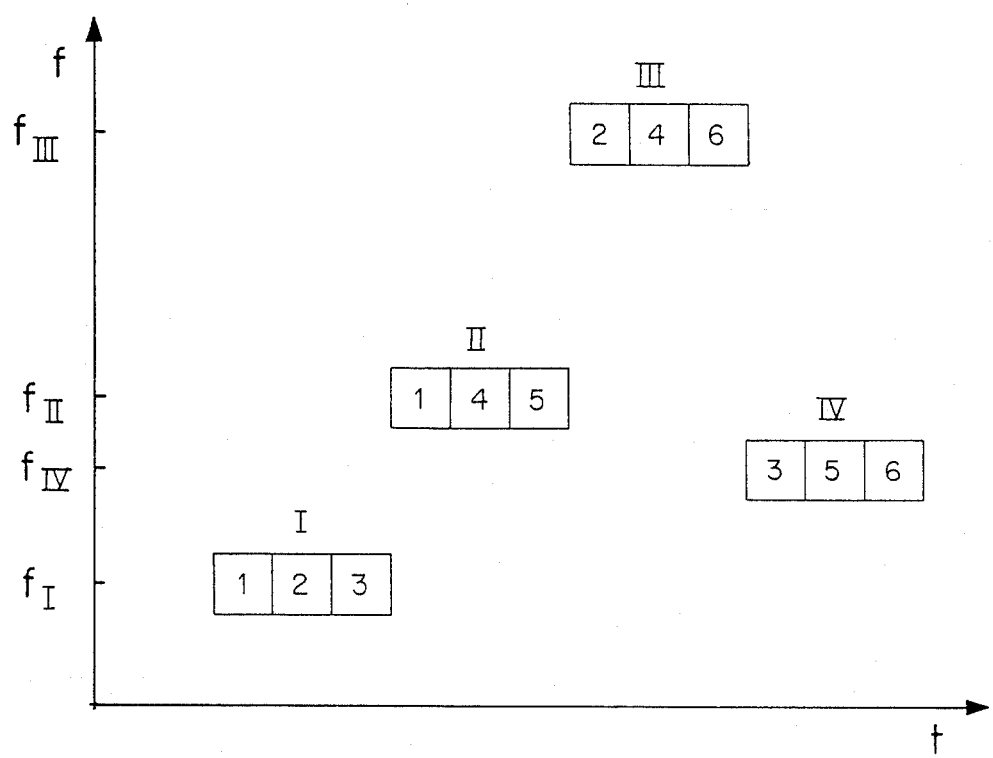
FIG. 1 is a diagrammatic in a frequency/time diagram showing the transmission of six symbols in four transmission sections carrying differnet frequencies.

Referring now to the drawings, wherein like reference numerals designate identical or corresponding parts throughout the several views, in FIG. 1, a frequency/time diagram, whose axes are marked f and t, diagrammatically shows how, in accordance with the invention, six symbols 1 to 6 can be transmitted, for example in four transmission sections I to IV. In this arangement, the symbols 1 to 6 are assumed to have been formed by modulating the phase of a carrier wave by one of the phase angles from the set of Phase angles $[0, 2\pi/n, \ldots, (n-1)2\pi/n]$ with n elements in a transmitter. A modulation method with n=2 is called "Binary Phase Shift Keying" (abbreviated to "BPSK") and a modulation method with n=4 is called "Quadriphase Shift Keying" (abbreviated "QPSK").

The four transmission sections are drawn vertically offset with respect to each other in FIG. 1 to illustrate that the carrier wave is to have various frequencies, for example those designated by $f_I$ to $f_{IV}$, in the individual transmission sections I to IV.

In FIG. 1, three symbols are transmitted per transmission section. As can be seen, all symbols 1 to 6 are transmitted twice, in such a manner that there are never two identical symbols in the same transmission section nor, in addition, are there two symbols from one transmission section in a single other transmission section. Multiple transmission of all symbols is actually not required for the success of the method according to the invention. It would be fundamentally sufficient to transmit only one symbol from each transmission section additionally in another transmission section. But due to the dual transmission of all symbols, redundant information is obtained, as will be explained below, for the synchronization of the individual transmission sections, which is of advantage particularly with respect to transmission errors due to disturbances in the transmission channel.

To recover the symbols 1 to 6 in a receiver, it is necessary to know the phase, that is to say the fundamental phase of the unmodulate carrier wave. Since the phase coherence can be lost during the phase jumps between the individual transmission sections I to IV, it is necessary to re-determine the phase relationship of the carrier wave in the receiver for each transmission section I to IV. The phases of the carrier wave within the individual transmission sections I to IV are also called block phases.

Figure 2:
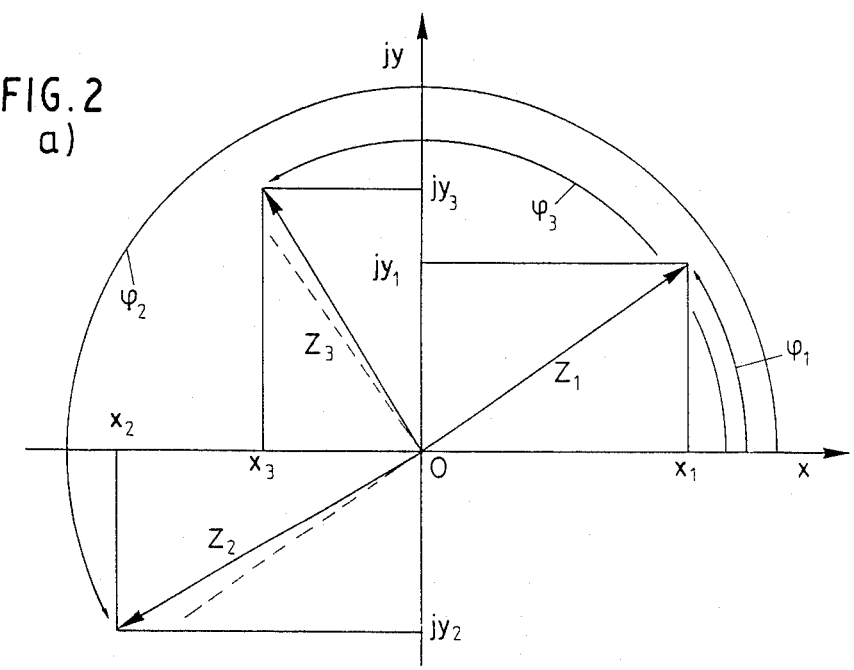
FIGS. 2a and 2b are vector diagrams explaining an estimating method for the preliminary determination of the block phases up to a phase uncertainty of n-times.
Figure 2:
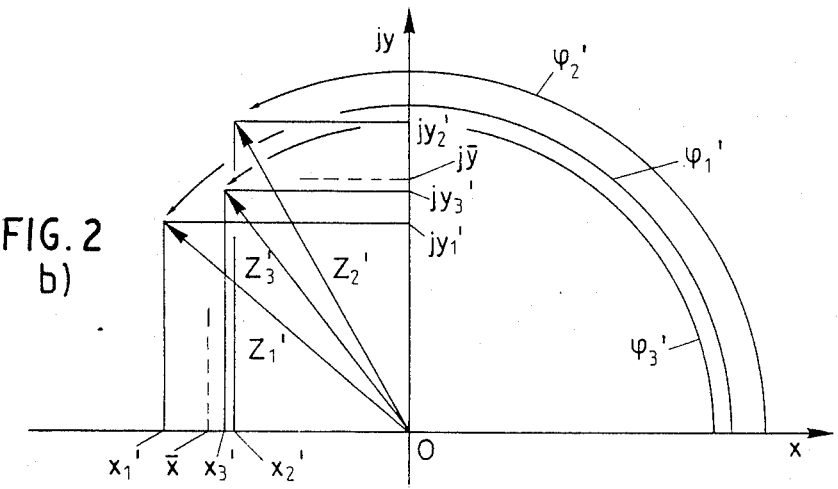
Figure 4:
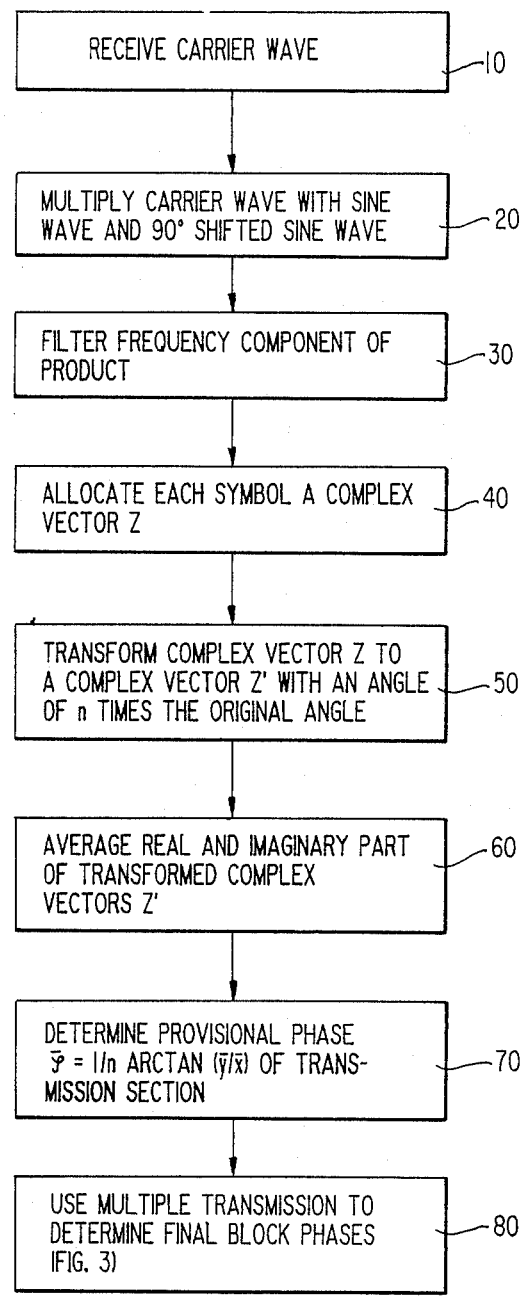
FIG. 4 is a flow chart showing the steps of the method of the invention.

The block phases are determined by means of an estimating method such as that described below, initially up to a phase uncertainty which is still n-times, which is known per se from an article b Andrew J. Viterbi and Audrey U. Viterbi entitled "Nonlinear Estimation of PKK-Modulated Carrier Phase with Application to Burst Digital Transmission", IEEE Transactions On Information Theroty, Vol. IT-29, No. 4, July 1983, pages 543-551, particularly from FIG. 2 and the associated description, and does not therefore need to be described in detail here. In the mehtod of the present invention, shown in the flow chart of FIG. 4, which includes preliminary steps taught by Vitterbi et al, above-noted, in step 10 the carrier wave is received in the receiver and modulated with the symbols 1 to 6 is first multiplied by a sinusoidal signal, generated, for example, by a sine-wave generator in the receiver and having essentially the same frequency—the sine-wave generator frequency must continuously follow the frequency jumps of the carrier wave for this purpose—, but arbitrary phase relationship and by a cosine signal corresponding to the latter as indicated in step 20 of FIG. 4. From the resultant product signals, the frqeuency components are filtered out in step 30, for example by integration, so that largely constant components remain in each case for the duration of transmission of the individual symbols 1 to 6. These components can be thought of as the imaginary and the real components of first vectors in the complex Gaussian plane jy-x as is shown in FIG. 2a and are allocated a complex vector Z (step 40, FIG. 4). In FIG. 2a, for example, the vector $Z_1$ and its components $x_1$ and $y_1$ shall correspond to symbol 1, the vector $Z_2$ and its components $x_2$ and $y_2$ to symbol 2 and the vector $Z_3$ and its components $x_3$ and $y_3$ to symbol 3 of the transmission section I of FIG. 1. In FIG. 2a, the phase angles are additionally drawn in and designated by $\psi_1$ to $\psi_3$, which phase angles enclose the vectors $Z_1$ to $Z_3$ with the positive real axis x which corresponds to the phase relationship of the sinusoidal signal generated in the receiver. These phase angles $\psi_1$ to $\psi_3$ are part of the n possible values of the required block phase of transmission section I. In the example of FIG. 2a it has been assumed that n is equal to 4 since the vectors $Z_1$ and $Z_3$ on the one hand, and $Z_2$ and $Z_3$ on the other hand, mutually enclose the phase angle of about $\pi/2$ and such a relative phase angle of two vectors occurs only from n=4, that is to say only with the use of the QPSK method. In the text which follows, it will be assumed that n is indeed=4.

Under ideal conditions, the vectors $Z_1$ to $Z_3$ in FIG. 2a should all have the same length and exactly the angles $\pi/2$ or $\pi$ with respect to each other. Due to the noise and due to interference in the transmission channel, however, both the lengths of the vectors deviate from each other and their relative phase angles deviate from the values $\pi/2$ and $\pi$, which is also shown in FIG. 2a). To minimize the influence of the noise and of interference as far as possible during the determination of the block phase, it is recommended to determine the block phase by averaging over several, preferably even all symbols, transmitted within the respective transmission section, in this case over the symbols 1 to 3. For this purpose, as indicated in step 50 in FIG. 4, the vectors $Z_1$ and $Z_3$ are transformed into vectors $Z_1'$ to $Z_3'$, which enclose an angle generally n-times, and in the case of the example of FIG. 2 with n=4, an angle 4-times larger than the real axis. The vectors $Z_1'$ to $Z_3'$ resulting from vectors $Z_1$ to $Z_3$ are shown in FIG. 2b, again in the Gaussian plane. As can be seen, all vectors $Z_1'$ to $Z_3'$ coincide in such a manner that averaging can be carried out in each case over their real and imaginary components $x_1'$ to $x_3'$ and $y_1'$ to $y_3'$. This is shown in step 60 in FIG. 4 by forming the arctangent function from the ratio of the mean value $\bar{y}$ of the imaginary components $y_1'$ to $y_3'$ to the mean value $\bar{x}$ of the real components $x_1'$ to $x_3'$, the desired mean phase $1/n$ (arctg $(\bar{y}/\bar{x})$ relative tot he phase relationship of the sinusoidal signal can then be determined as indicated in step 70 in FIG. 4, apart from the above-mentioned phase uncertainty still remaining. In the case of the example with n=4, this phase uncertainity means that the true block phase of the transmission section could also be $0.68\pi$, $1.18\pi$ or $1.68\pi$ instead of $0.18\pi$ as can be seen from FIG. 2b. U.S. Pat. No. 4,466,108 to Rhodes shows specific hardware by which steps 10-70 in FIG. 4 can be performed.

Figure 3:
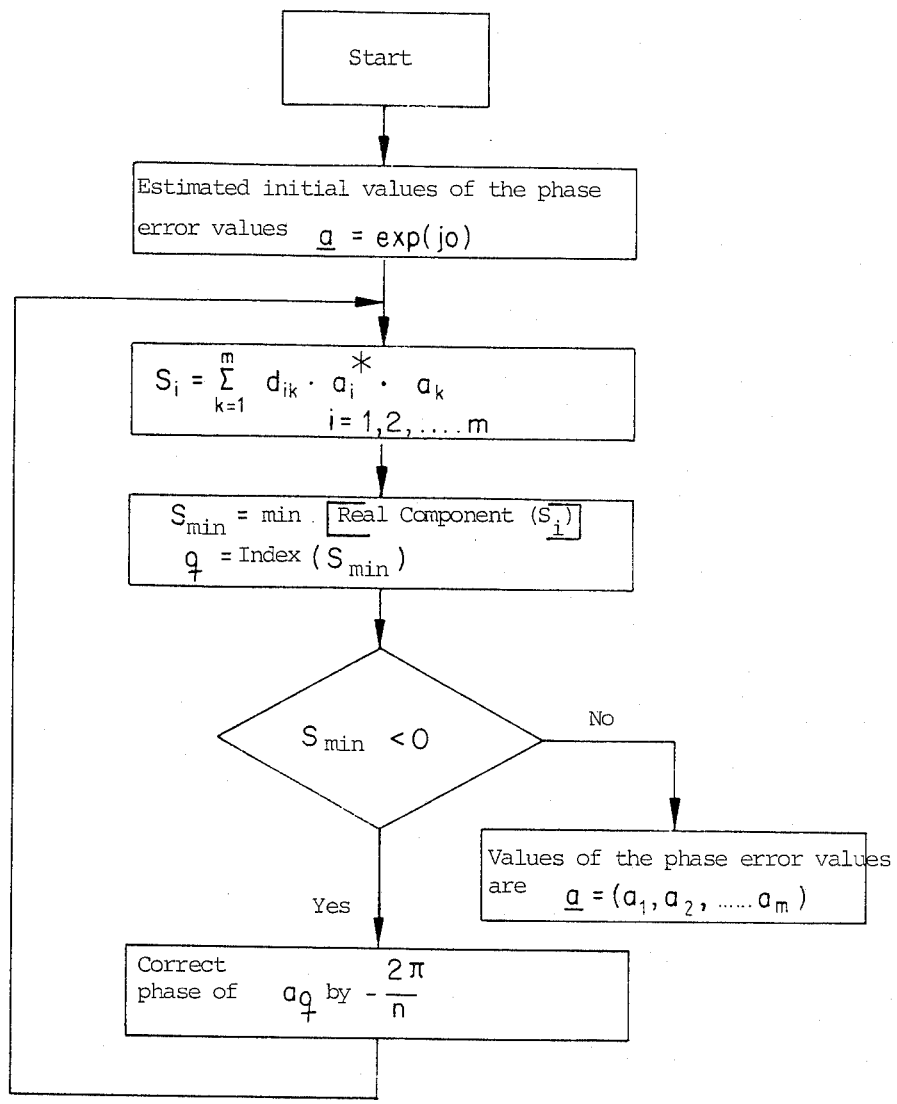
FIG. 3 is a flow-chart in explanation of an evalution method for obtaining the final block phases.

For the further explanations, the assumption is then made that the estimating method explained above has been used for determining for all transmission sections I to IV the associated block phases apart from the phase uncertainity which is in each case n-times. By evaluating the synchronization information obtained by the multiple transmission of symbols 1 to 6, the final block phases of the transmission sections I to IV can be obtained as indicated in step 80 in FIG. 4, the details of which are shown in FIG. 3. For this purpose, n possible states of the individual symbols must initially also be determined within the individual transmission sections, using the still uncertain block phases, complex numbers from the set [exp(jO), exp (j$2\pi$/n), . . . , exp (j(n−1)$2\pi$/n)] being allocated as values to the individual states. For two corresponding symbols in each case from different transmission sections identified below by the indices i and k, the state value of the symbol from the transmission section having the index i is then multiplied by the conjugate complex state value of the symbol from the transmission section having the index k and the products $d_{ik}$ are in each case equated to products $a_i a^*_k{}^*$, where $a_i$ means an initially unknown complex phase error value allocated to the transmission section having the index j and $a_k$ means the conjugate complex value of an also still unknown complex phase error value $a_k^*$ allocated to the transmission section having the index k.

In the example of FIG. 1, the following system of equations would result from this, where $b_{1I}$ is the state value of the symbol 1 in the transmission section I, $b_{1II}^*$ is the conjugate complex state value of the symbol 1 of transmission section II and so forth:

$$b_{1I} \cdot b_{1II}^* = d_{I\ II} = a_I \cdot a_{II}^*$$

$$b_{2II} \cdot b_{2III}^* = d_{I\ III} = a_I \cdot a_{III}^*$$

$$b_{3I} \cdot b_{3IV}^* = d_{I\ IV} = a_I \cdot a_{IV}^*$$

$$b_{4II} \cdot b_{4III}^* = d_{II\ III} = a_{II} \cdot a_{III}^*$$

$$b_{5II} \cdot b_{5IV}^* = d_{II\ IV} = a_{II} \cdot a_{IV}^*$$

$$b_{6III} \cdot b_{6IV}^* = d_{III\ IV} = a_{III} \cdot a_{IV}^*$$

The unkown phase error values can be determined from at least a number of equations equal to the number of the pre-determined transmission sections, of the system of equations. In the case of the example, a total of six equations are available for the four unkown phase error values $a_I$ to $a_{IV}$, that is to say that the system of equations selected as example is over-determined. This over-determination is the result of each symbol having been transmitted twice in the example of FIG. 1. As has already been mentioned, it is suficient per se to transmit additionally in each case only one symbol from each transmission section in another transmission section. This would result in a system of equations determined by simple means. An over-determined system of equations such as that above, however, supplies a certain redundancy for determining the unknown phase error values which can be of great advantage particularly with respect to transmission errors.

The phase error values, i.e., the phase error values $a_I$ to $a_{IV}$ in the case of the example, after having been determined, are used for correcting the block phases, the block phases preliminarily determined within the individual transmisison sections being corrected in each case by a phase angle which in each case corresponds to the negative argument of the phase error value allocated to the respective transmission section.

The unknown phase error values can be particularly elegantly determined from systems of equations such as that shown as an example, resulting from the dual transmission of all symbols, in the follwoing manner also shown in the flow-chart of FIG. 3:

All phase error values are allocated exp(jO) as an initial value. Following this, a number m, corresponding to the pre-determined number of transmission sections, of sums $$S_i = \sum_{k=1}^{m} d_{ik}\, a_i^*\, a_k$$

is formed, $d_{ik}$, $a_j$, $a_k$ again having the meaning already previously defined and the asterisk again indicating the conjugate complex property. Of the sums formed, the one with the smallest real component and its index i is determined. If this real component is positive, the current phase error values are interpreted as being their final values to be determined; otherwise, the argument of the phase error value $a_i$ is corrected by $-2\pi/n$ and the summings, the index determination and the sign determination are again carried out, that is to say the programme runs through a loop. It is easiest to carry out these method steps by means of a digital computer.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Method for demodulating a carrier wave, said carrier wave being composed of several transmission sections, each transmission section having a separate frequency which is modulated by means of phase shift keying and each transmission section containing data in the form of a plurality of symbols in such a manner that at least one symbol of a transmission section is also a member of another transmission section, said method comprising the steps of:

generating for each of said transmission sections a sinusoidal signal having essentially the separate frequency of the carrier wave corresponding to said transmission section but an arbitraty phase relationship relative to said separate phase of said corresponding carrier wave;

multiplying the received phase modulated carrier wave separately by said sinusoidal signal and a signal derived from said sinusoidal signal by a 90°-phase shift for each of said transmission sections;

extracting from each of the products of the multiplying steps the constant components for each of said symbols by filtering out the frequency components;

allocating each of said symbols a complex vector whose components are said constant components of the corresponding of said multiplication products;

rotating each of said complex vectors by an angle which is n times its origianl angle;

determining the components of each of said rotated complex vectors;

determining separately the mean values for the real and imaginary components of all said rotated complex vectors within one of said transmission sections;

determining from the ratio of said mean values via the formation of an arc-tangent function and subsequent division by the number n a provisional carrier phase for each of said transmission sections;

demodulting said received phase modulated carrier waves by means of said provisional carrier phases;

allocating each demodulated symbol a complex number representing its individual state;

multiplying for each symbol multiply transmitted in different of said transmission sections, identified by indices i and k, the corresponding of said representative complex numbers, whereby the complex number of the i-th transmission section is multiplied with the conjugate of the complex number of the k-th transmission section;

determining complex phase differences;

allocating all of said complex phase differences as an initial value the number exp(jO);

forming m sums $S_i (i=1, \ldots, m)$ of the form $$S_i = \sum_{k=1}^{m} d_{ik} a_i^* a_K,$$

wherein $a_i$ is the unkown complex phase difference i the i-th transmission section between said provisional carrier phase and said final phase, and $a_K^*$ is the conjugate complex value of the respective phase difference in the k-th transmission section;

determining the one of said sums $S_i$ which has the smallest real component;

determining the index of said determined sum, and if said smallest real component is positive, taking the complex phase differnce $a_i$ of said determined sum as the complex phase differences used in said provisional carrier phase correction, if said smallest real component is not positive, performing another iteration, wherein the argument of said initial values of said complex phase differences are all corrected by the value $-2\pi/n$; and obtaining said final phases by correcting said provisional carrier phases with a phase angle which in each case corresponds to the negative argument of the corresponding of said complex phase difference.

2. Method as claimed in claim 1, wherein each of said symbols is transmitted in two different of said transmission sections.

3. Method as claimed in claim 2, wherein each of said symbols is transmitted only one time in each of said transmission sections.

* * * * *